United States Patent
Tsutsumi et al.

(10) Patent No.: US 9,483,044 B2
(45) Date of Patent: *Nov. 1, 2016

(54) CONTROL DEVICE FOR MACHINE TOOL WITH TIME ESTIMATION UNIT FOR ESTIMATING TIME UNTIL MOTOR REACHES OVERHEAT TEMPERATURE

(71) Applicant: FANUC CORPORATION, Yamanashi (JP)

(72) Inventors: Tomohisa Tsutsumi, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 318 days.

This patent is subject to a terminal disclaimer.

(21) Appl. No.: 14/158,691

(22) Filed: Jan. 17, 2014

(65) Prior Publication Data
US 2014/0207273 A1    Jul. 24, 2014

(30) Foreign Application Priority Data

Jan. 21, 2013  (JP) ................... 2013-008535
Nov. 21, 2013  (JP) ................... 2013-240795

(51) Int. Cl.
G05B 19/4063    (2006.01)
(52) U.S. Cl.
CPC ................ G05B 19/4063 (2013.01)
(58) Field of Classification Search
CPC ................................... G05B 19/4063

USPC ................... 700/177, 176; 318/569
See application file for complete search history.

(56) References Cited

U.S. PATENT DOCUMENTS

| 6,291,959 B1 | 9/2001 | Yoshida et al. |
| 2006/0089745 A1* | 4/2006 | Suzuki ............. G05B 19/404 700/176 |
| 2007/0200528 A1 | 8/2007 | Itou et al. |

FOREIGN PATENT DOCUMENTS

| JP | 5321645 A | 12/1993 |
| JP | 2000-271836 A | 10/2000 |
| WO | 2005/093942 A1 | 10/2005 |

* cited by examiner

Primary Examiner — Tejal Gami
(74) Attorney, Agent, or Firm — Hauptman Ham, LLP

(57) ABSTRACT

A control device for a machine tool including a motor for driving a spindle includes: a current detection unit that detects a current driving the motor; a storage unit that stores overheat temperature specified for the motor; a temperature detection unit that detects temperature of the motor; a time estimation unit that estimates, by using the temperature detected by the temperature detection unit and the overheat temperature, time from when present estimation takes place until the motor reaches the overheat temperature, under a condition in which the current detected by the current detection unit continuously passes through the motor; and a provision unit that provides the time estimated by the time estimation unit.

9 Claims, 8 Drawing Sheets

CONTROL DEVICE FOR MACHINE TOOL WITH TIME ESTIMATION UNIT FOR ESTIMATING TIME UNTIL MOTOR REACHES OVERHEAT TEMPERATURE

RELATED APPLICATIONS

The present application claims priority to Japanese Application Number 2013-008535, filed Jan. 21, 2013, and Japanese Application Number 2013-240795, filed Nov. 21, 2013, the disclosures of which are hereby incorporated by reference herein in their entirety.

BACKGROUND OF THE INVENTION

1. Field of the Invention

The present invention relates to a control device for a machine tool including a motor for driving a spindle of the machine tool.

2. Description of the Related Art

When cutting using a spindle of a machine tool, a motor that drives the spindle is normally operated under load lower than or equal to its continuous rated load of the motor. Continuous rated load indicates the maximum level of load at which the motor would not overheat even when the load is continuously applied to the motor for infinite time.

However, in the case of heavy-duty cutting, or when machining time is desired to be shortened by increasing, for a short period of time, the load to be applied to the motor, the motor is sometimes rotated under load exceeding the continuous rated load.

In general, for cutting under load exceeding the continuous rated load, a graph showing the allowable load characteristics is provided for each motor to indicate "under n % load, how many minutes the cutting is possible before the motor overheats". An operator performs a cutting operation by setting up a guide on the basis of the information from the graphs. In an allowable-load characteristics graph, possible cutting time is defined in terms of load. This allows the operator to see how long certain load can be continuously applied to the motor before the motor overheats, by referring to a corresponding allowable-load characteristics graph.

FIG. 9 is a graph showing an example of the allowable load characteristics of a motor. In FIG. 9, the horizontal axis shows a rotation speed of the motor, and the vertical axis shows the load applied to the motor. The 100 percent load indicates the continuous rated load, and, under this load, the motor does not overheat even if the load is continuously applied to the motor for infinite time. The example shown in FIG. 9 indicates that, when the motor is rotated at a low speed, cutting for 2.5 minutes in 10-minute cycle is possible under 200 percent load, and cutting for 1 minute in 10-minute cycle is possible under 230 percent load.

If the motor is rotated under load exceeding the continuous rated load, the motor may generate heat above the allowable heat generation rate, which may eventually cause the motor to break down.

To address this problem, for example, as disclosed in Japanese Patent Application Publication No. 2000-271836, the following control device has been proposed. The control device estimates the heat generation rate of an entire program from estimated values of heat generation rates of a motor at the time of rapid traverse and cutting traverse, and then changes time constants so that the heat generation rate of the entire program would be lower than or equal to the allowable heat generation rate.

Moreover, for example, as disclosed in WO 2005/093942, the following method of preventing overload of a motor has been proposed. In this method, loss (copper loss and iron loss) occurring at a motor is calculated, and, by assuming that loss obtained by subtracting the calculated loss from a rated loss is manageable by the motor, d-axis current corresponding to the obtained loss is passed through the motor.

Allowable load characteristics generally vary among motors. Even by taking into account this respect, if an operator needs to perform a cutting operation while constantly referring to the allowable-load characteristics graphs, such an operation is inefficient and is not likely to be carried out usually. Hence, machining is generally performed by trusting operator's experience and intuition. For example, to prevent a motor from overheating, the motor is sometimes driven with an adequate margin of performance in comparison with the intrinsic performance of the motor. However, such a way of driving is not efficient. Moreover, for example, when machining was performed by trusting operator's intuition, the motor ended up being overloaded and consequently overheating, which stopped the machining, in some cases.

For example, in the invention described in Japanese Patent Application Publication No. 2000-271836 mentioned above, although estimation of the heat generation rate of the motor is made, it is difficult to know how long the machining can be continued before the motor overheats.

For example, in the invention described in WO 2005/093942 mentioned above, although loss including iron loss is estimated, it is difficult to know how long the machining can be continued before the motor overheats.

If it is possible, in machining that involves application of load exceeding the continuous rated load, to know how long the machining can be continued under the current overload to the motor, the motor can be used optimally in terms of the performance of the motor without causing the motor to overheat.

SUMMARY OF THE INVENTION

In view of the above, an object of the present invention is to provide a control device for a machine tool, the control device being capable of easily estimating the time until a motor reaches its overheat temperature when the motor is driven under load.

To achieve the above-described object, in a first aspect, a control device for a machine tool including a motor for driving a spindle, includes: a current detection unit that detects a current driving the motor; a storage unit that stores overheat temperature specified for the motor; a temperature detection unit that detects temperature of the motor; a time estimation unit that estimates, by using the temperature detected by the temperature detection unit and the overheat temperature, time from when present estimation takes place until the motor reaches the overheat temperature, when the current detected by the current detection unit continuously passes through the motor; and a provision unit that provides the time estimated by the time estimation unit.

According to the above-described first aspect, the control device for a machine tool further includes a temperature-increase-value estimation unit that estimates a temperature increase value due to copper loss of the motor produced when the current detected by the current detection unit continuously passes through the motor, and the time estimation unit estimates the time by using the temperature detected by the temperature detection unit, the overheat temperature, and the temperature increase value due to the copper loss.

Moreover, according to the above-described first aspect, the control device for a machine tool may further include a rotation speed detection unit that detects a rotation speed of the motor. In this case, the temperature-increase-value estimation unit estimates the temperature increase value due to the copper loss, and a temperature increase value due to iron loss of the motor produced when the motor continuously rotates at the rotation speed detected by the rotation speed detection unit, and the time estimation unit estimates, by using the temperature detected by the temperature detection unit, the overheat temperature, the temperature increase value due to the copper loss, and the temperature increase value due to the iron loss, time from when present estimation takes place until the motor reaches the overheat temperature, when the motor continuously rotates at the rotation speed detected by the rotation speed detection unit and the current detected by the current detection unit continuously passes through the motor.

Further, according to a second aspect, a control device for a machine tool including a motor for driving a spindle, includes: a current detection unit that detects a current driving the motor; a temperature-increase-value estimation unit that estimates a temperature increase value due to copper loss of the motor produced when the current detected by the current detection unit continuously passes through the motor; a storage unit that stores overheat temperature specified for the motor; a time estimation unit that estimates, by using the temperature increase value due to the copper loss and the overheat temperature, time from when present estimation takes place until the motor reaches the overheat temperature, when the current used for estimating the temperature increase value due to the copper loss continuously passes through the motor; and a provision unit that provides the time estimated by the time estimation unit.

Moreover, according to the above-described second aspect, the control device for a machine tool may further include a rotation speed detection unit that detects a rotation speed of the motor. In this case, the temperature-increase-value estimation unit estimates the temperature increase value due to the copper loss, and a temperature increase value due to iron loss of the motor produced when the motor continuously rotates at the rotation speed detected by the rotation speed detection unit, and the time estimation unit estimates, by using the temperature increase value due to the copper loss, the temperature increase value due to the iron loss, and the overheat temperature, time from when present estimation takes place until the motor reaches the overheat temperature, when the motor continuously rotates at the rotation speed detected by the rotation speed detection unit and the current used for estimating the temperature increase value due to the copper loss continuously passes through the motor.

Further, according to any one of the above-described first and second aspects, the provision unit may be an indicator provided to a numerical control device for the machine tool.

Further, according to any one of the above-described first and second aspects, the provision unit may be an indicator externally connected to a numerical control device for the machine tool.

BRIEF DESCRIPTION OF THE DRAWINGS

The present invention can be understood more clearly by referring to the accompanying drawings in which.

DESCRIPTION OF THE PREFERRED EMBODIMENTS

Figure 1:
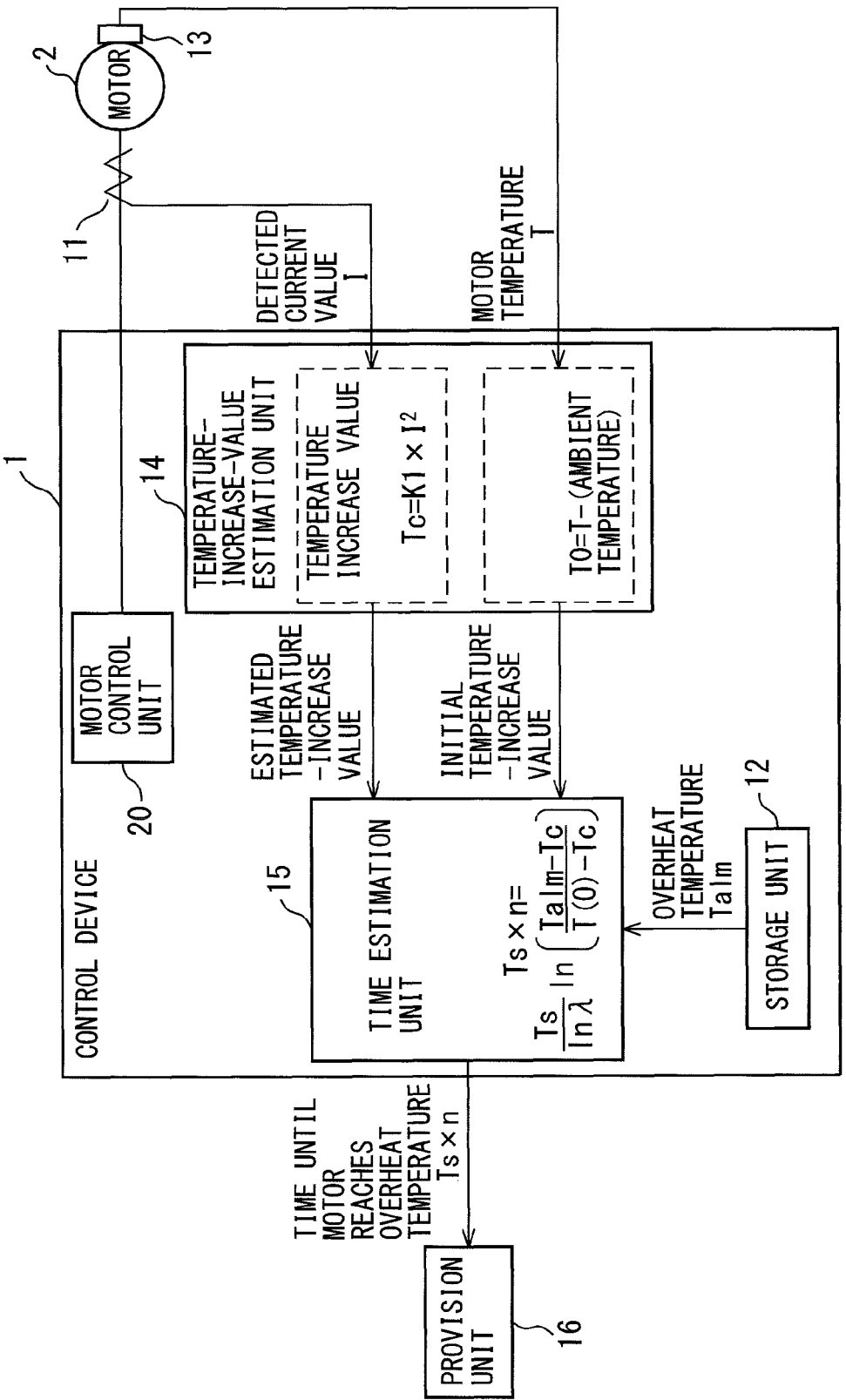
FIG. 1 is a block diagram showing a control device for a machine tool according to a first embodiment.

In the following, description will be given of a control device for a machine tool with a time estimation unit for estimating time until a motor reaches its overheat temperature, by referring to the drawings. However, it should be understood that the present invention is not limited by the drawings and the embodiments to be described below.

FIG. 1 is a block diagram showing a control device for a machine tool according to a first embodiment. In the following, it is intended that constituent elements denoted by the same reference numerals in different drawings have the same functions.

According to the first embodiment, a control device 1 for a machine tool including a motor for driving a spindle includes a current detection unit 11, a storage unit 12, a temperature detection unit 13, a temperature-increase-value estimation unit 14, a time estimation unit 15, and a provision unit 16. In addition, the control device 1 further includes a motor control unit 20 that supplies current for driving a motor 2. On the basis of a motor drive command received from an upper-level control device (not illustrated), the motor control unit 20 converts an alternating-current power supplied from the alternating-current side, to a direct-current power, outputs the obtained direct-current power, thereafter converts the direct-current power to an alternating-current power for driving the motor 2, and then supplies the obtained alternating-current power to the motor 2.

The current detection unit 11 detects a value of a current I driving the motor 2.

The storage unit 12 stores an overheat temperature Talm specified for the motor 2, in advance.

The temperature detection unit 13 detects a temperature T of the motor 2.

The temperature-increase-value estimation unit 14 will be described later.

The time estimation unit 15 estimates, by using the temperature T detected by the temperature detection unit 13 and the overheat temperature Talm stored in the storage unit 12, time from when the present estimation takes place until the motor 2 reaches the overheat temperature Talm, under a condition in which the current I detected by the current detection unit 11 continuously passes through the motor 2.

The provision unit 16 provides the time estimated by the time estimation unit 15.

Next, the principle of operation of the control device 1 for a machine tool according to the first embodiment will be described.

The motor 2 generates heat due to copper loss and iron loss, the copper loss corresponding to loss that is lost at the copper winding of the motor 2 when a current for driving the motor 2 passes through the winding, the iron loss corresponding to loss that is lost when an eddy current passes through the core of the motor 2. When the motor 2 is driven at a low speed, copper loss affects the heat generation of the motor 2 more dominantly than iron loss. In the first embodiment, the time until the motor 2 reaches the overheat temperature Talm is estimated without taking into account iron loss, by assuming the use of driving the motor 2 at a low speed.

The temperature increase value due to the copper loss of the motor 2 to be produced when the current I continuously passes through the motor 2 is in proportion to the square of the current I. In other words, an ultimate temperature increase value Tc of the motor 2 is expressed by Formula 1.

$$Tc = K1 \times I^2 \quad (1)$$

In Formula 1, K1 is obtained in advance by calculating back from the temperature increase value obtained when a certain current is supplied to the motor 2.

Assume that a thermal time constant of the motor 2 is denoted by $\tau$ and sampling time is denoted by Ts. In this case, the temperature increase value T(n) can be calculated by using the recurrence formula shown in Formula 2.

$$T(n) = \lambda \times T(n-1) + (1-\lambda) \times Tc, \quad \text{wherein } \lambda = e^{-\frac{Ts}{\tau}} \quad (2)$$

By reducing the recurrence formula shown in Formula 2, Formula 3 is obtained.

$$T(n) = \lambda^n \times (T(0) - Tc) + Tc \quad (3)$$

In Formula 3, T(0) denotes an initial value of the temperature increase value T(n) of the motor 2. By defining the initial temperature-increase value T(0), the temperature increase value T(n) of the motor 2 can be estimated by using Formula 3.

By further rewriting Formula 3, Formula 4 is obtained.

$$n = \frac{1}{\ln \lambda} \times \ln\left(\frac{Talm - Tc}{T(0) - Tc}\right) \quad (4)$$

Assume that the overheat temperature expresses the amount of increase from the detected temperature T, and is denoted by Talm. In this case, if the initial temperature-increase value T(0) at a certain time point is obtained, the time "Ts×n" from when the present estimation takes place until the motor 2 reaches the overheat temperature Talm, under the condition in which the current I continuously passes through the motor 2, is expressed as Formula 5.

$$Ts \times n = \frac{Ts}{\ln \lambda} \times \ln\left(\frac{Talm - Tc}{T(0) - Tc}\right) \quad (5)$$

In the first embodiment, the temperature T is detected by the temperature detection unit 13, and the current I passing through the motor 2 is detected by the current detection unit 11.

Moreover, the temperature increase value Tc due to the copper loss of the motor 2 to be produced when the current I detected by the current detection unit 11 continuously passes through the motor 2, is estimated by the temperature-increase-value estimation unit 14 by using Formula 1.

Further, especially in the first embodiment, the difference between the temperature T near the motor 2 detected by the temperature detection unit 13 and the ambient temperature of the machine tool including the motor 2, is used as the initial temperature-increase value T(0) at a certain time point.

Then, by using the overheat temperature (increased amount) Talm stored in the storage unit 12 in advance, the temperature increase value Tc due to the copper loss estimated by the temperature-increase-value estimation unit 14, and the initial temperature-increase value T(0) corresponding to the difference between the temperature T detected by the temperature detection unit 13 and the ambient temperature, the time estimation unit 15 calculates, using Formula 5, the time "Ts×n" from when the present estimation takes place until the motor 2 reaches the overheat temperature Talm, under the condition in which the current I continuously passes through the motor 2. In other words, in the first embodiment, the time estimation unit 15 calculates the time "Ts×n" from when the present estimation takes place until the motor 2 reaches the overheat temperature Talm, by using the temperature T detected by the temperature detection unit 13, the overheat temperature Talm, and the temperature increase value Tc due to the copper loss. The calculated time "Ts×n" is provided by the provision unit 16.

Figure 2:
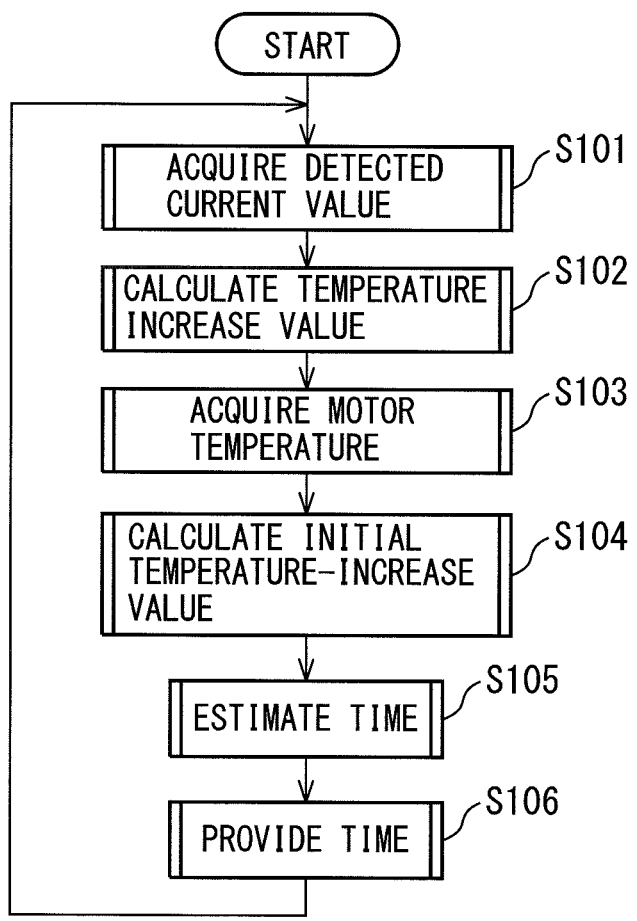
FIG. 2 is a flowchart showing an operation flow of the control device for the machine tool according to the first embodiment.

FIG. 2 is a flowchart showing an operation flow of the control device for the machine tool according to the first embodiment.

First, in Step S101, the current detection unit 11 detects a value of the current I driving the motor 2.

Then, in Step S102, the temperature-increase-value estimation unit 14 estimates, by using Formula 1, the temperature increase value Tc due to the copper loss of the motor 2 to be produced when the current I detected by the current detection unit 11 continuously passes through the motor 2.

Moreover, in Step S103, the temperature detection unit 13 detects the temperature T of the motor 2. Note that the execution order of the operations in Steps S102 and S103 is interchangeable.

In Step S104, the temperature-increase-value estimation unit 14 calculates the difference between the temperature T detected by the temperature detection unit 13 and the ambient temperature, as the initial temperature-increase value T(0) at a certain time point.

Then, in Step S105, by using the overheat temperature (increased amount) Talm stored in the storage unit 12 in advance, the temperature increase value Tc, due to the copper loss, estimated by the temperature-increase-value estimation unit 14, and the initial temperature-increase value T(0) corresponding to the difference between the temperature T detected by the temperature detection unit 13 and the ambient temperature, the time estimation unit 15 calculates, using Formula 5, the time "Ts×n" from when the present estimation takes place until the motor 2 reaches the overheat temperature Talm, under the condition in which the current I continuously passes through the motor 2.

In Step S106, the provision unit 16 provides the time "Ts×n" from when the present estimation takes place until the motor 2 reaches the overheat temperature Talm, under the condition in which the current I continuously passes through the motor 2, the time "Ts×n" being calculated by the time estimation unit 15.

Next, description will be given of a second embodiment. In the second embodiment, the use of driving the motor 2 at a high speed is assumed. In the first embodiment described above, the time until the motor 2 reaches the overheat temperature Talm is estimated without taking into account iron loss by assuming the use of driving the motor 2 at a low speed. By contrast, in the second embodiment, since the motor 2 is rotated at a high speed, the time until the motor 2 reaches the overheat temperature Talm is estimated by taking into account heat generated due to iron loss as well as copper loss.

Figure 3:
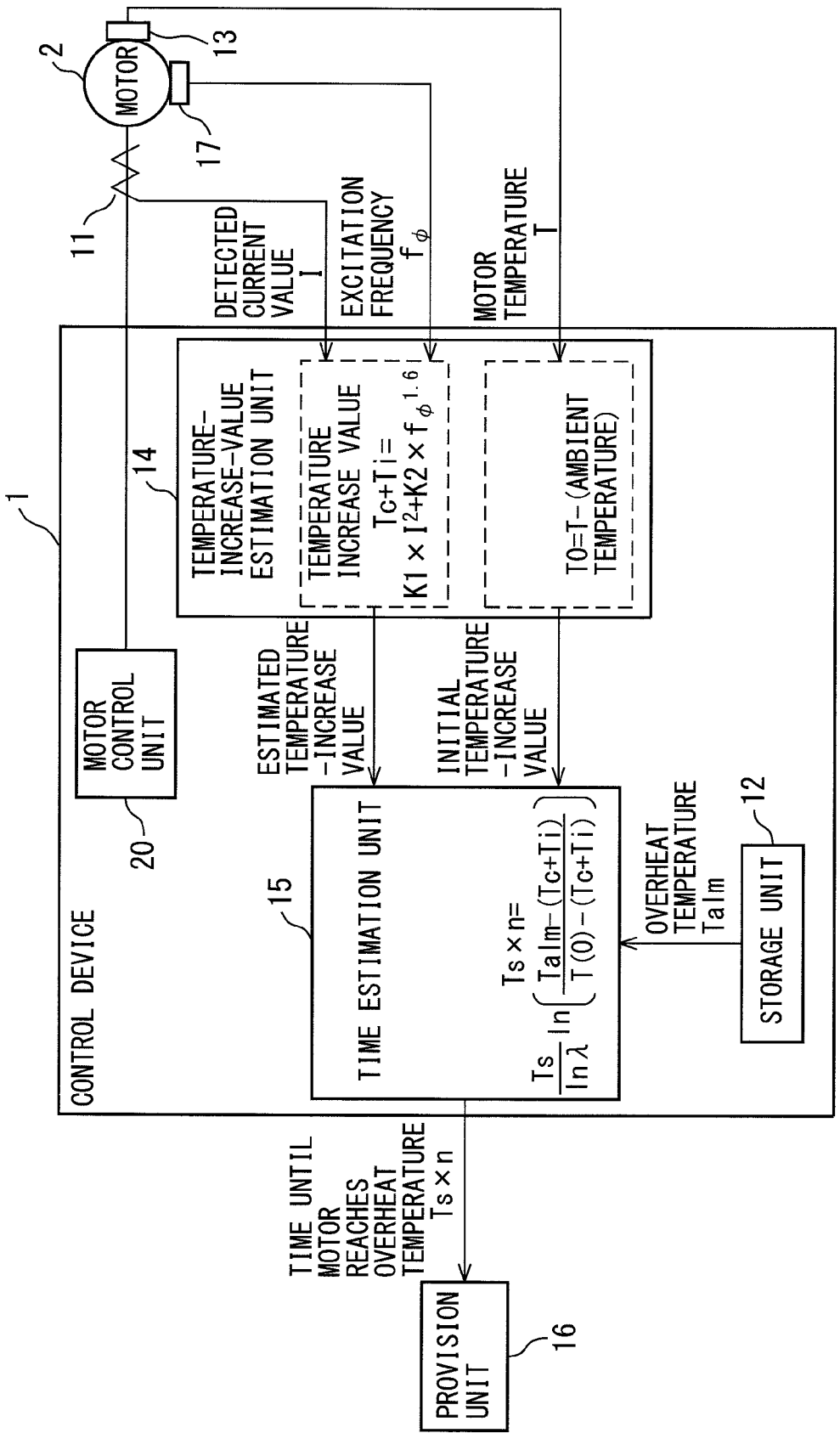
FIG. 3 is a block diagram showing a control device for a machine tool according to a second embodiment.

FIG. 3 is a block diagram showing a control device for a machine tool according to the second embodiment. According to the second embodiment, a control device 1 for a machine tool including a motor for driving a spindle includes the current detection unit 11, the storage unit 12, the temperature detection unit 13, a temperature-increase-value estimation unit 14, a time estimation unit 15, the provision unit 16, and a rotation speed detection unit 17. In addition, the control device 1 includes the motor control unit 20.

Since the current detection unit 11, the storage unit 12, the temperature detection unit 13, the provision unit 16, and the motor control unit 20 are as described by referring to FIG. 1, detailed description of these units is omitted.

The rotation speed detection unit 17 detects a rotation speed of the motor 2.

The temperature-increase-value estimation unit 14 estimates the temperature increase value Tc due to the copper loss described in the first embodiment above, and a temperature increase value Ti due to the iron loss of the motor 2 to be produced when the motor 2 continuously rotates at the rotation speed detected by the rotation speed detection unit 17.

As described above, when the motor 2 rotates at a low speed, copper loss is more dominant in the loss of the motor 2. By contrast, when the motor 2 rotates at a high speed, iron loss also has a large influence. In the second embodiment, assuming the use of driving the motor 2 at a high speed, the time until the motor 2 reaches the overheat temperature Talm is estimated by taking into account the copper loss and the iron loss.

Although it is difficult to accurately estimate the temperature increase value Ti due to the iron loss, a method of estimating the temperature increase value Ti due to the iron loss by using Formula 6 is empirically known as described in WO 2005/093942, for example.

$$Ti = K2 \times f_\phi^{1.6} \tag{6}$$

In this case, $f_\phi$ denotes an excitation frequency of magnetic flux, that is, "rotation speed of motor 2×number of pole pairs/60". Accordingly, when the number of rotations of the motor 2 per unit time is obtained by the rotation speed detection unit 17, the rotation speed of the motor 2 and also the excitation frequency $f_\phi$ can be found. K2 in Formula 6 is obtained in advance by calculating back from the temperature increase value when the motor 2 is rotated without any load.

Assume that the thermal time constant of the motor 2 is denoted by $\tau$ and sampling time is denoted by Ts. In this case, the temperature increase value T(n) can be calculated by using the recurrence formula shown in Formula 7.

$$T(n) = \lambda \times T(n-1) + (1-\lambda) \times (Tc + Ti), \lambda = e^{-\frac{Ts}{\tau}} \tag{7}$$

By reducing the recurrence formula shown in Formula 7, Formula 8 is obtained.

$$T(n) = \lambda^n \times \{T(0) - (Tc+Ti)\} + (Tc+Ti) \tag{8}$$

In Formula 8, T(0) denotes the initial value of the temperature increase value T(n) of the motor 2. By defining the initial temperature-increase value T(0), the temperature increase value T(n) of the motor 2 can be estimated by using Formula 8.

By further rewriting Formula 8, Formula 9 is obtained.

$$n = \frac{1}{\ln\lambda} \times \ln\left(\frac{Talm - (Tc + Ti)}{T(0) - (Tc + Ti)}\right) \tag{9}$$

Assume that the overheat temperature expresses the amount of increase from the detected temperature T, and is denoted by Talm. In this case, if the initial temperature-increase value T(0) at a certain time point is obtained, the time "Ts×n" from when the present estimation takes place until the motor 2 reaches the overheat temperature Talm, under the condition in which the current I continuously passes through the motor 2, can be calculated by using Formula 10.

$$Ts \times n = \frac{Ts}{\ln\lambda} \times \ln\left(\frac{Talm - (Tc + Ti)}{T(0) - (Tc + Ti)}\right) \tag{10}$$

In the second embodiment, the temperature T is detected by the temperature detection unit 13, and the current I passing through the motor 2 is detected by the current detection unit 11. In addition, the rotation speed of the motor 2 is detected by the rotation speed detection unit 17.

Moreover, the temperature increase value Tc due to the copper loss of the motor 2 to be produced when the current I detected by the current detection unit 11 continuously passes through the motor 2, is estimated by the temperature-increase-value estimation unit 14 using Formula 1. In addition, the temperature increase value Ti due to the iron loss of the motor 2 to be produced when the motor 2 continuously rotates at the rotation speed detected by the rotation speed detection unit 17, is estimated by the temperature-increase-value estimation unit 14 using Formula 6.

Further, especially in the second embodiment, the difference between the temperature T near the motor 2 detected by the temperature detection unit 13 and the ambient temperature of the machine tool including the motor 2, is used as the initial temperature-increase value T(0) at a certain time point.

Then, by using the overheat temperature (increased amount) Talm stored in the storage unit 12 in advance, the temperature increase value Tc due to the copper loss and the temperature increase value Ti due to the iron loss estimated by the temperature-increase-value estimation unit 14, and the initial temperature-increase value T(0) corresponding to the difference between the temperature T detected by the temperature detection unit 13 and the ambient temperature, the time estimation unit 15 calculates, using Formula 10, the time "Ts×n" from when the present estimation takes place until the motor 2 reaches the overheat temperature Talm, under the condition in which the motor 2 continuously rotates at the rotation speed detected by the rotation speed detection unit 17 and the current I continuously passes through the motor 2. In other words, in the second embodiment, the time estimation unit 15 calculates the time "Ts×n" from when the present estimation takes place until the motor 2 reaches the overheat temperature Talm, by using the temperature T detected by the temperature detection unit 13, the overheat temperature Talm, the temperature increase value Tc due to the copper loss, and the temperature increase value Ti due to the iron loss. The calculated time "Ts×n" is provided by the provision unit 16.

Figure 4:
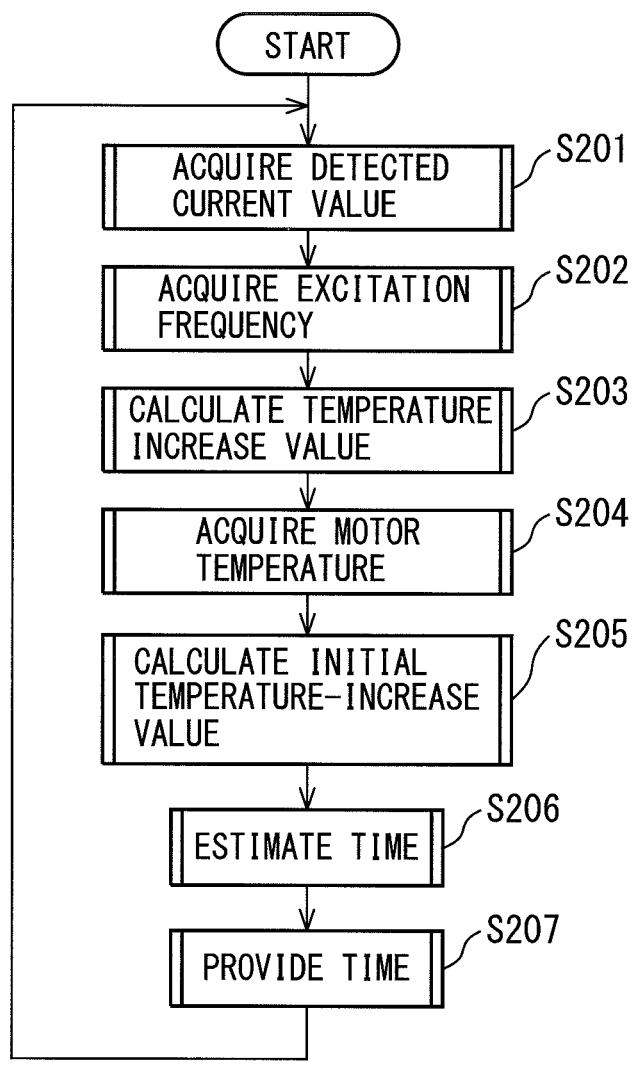
FIG. 4 is a flowchart showing an operation flow of the control device for the machine tool according to the second embodiment.

FIG. 4 is a flowchart showing an operation flow of the control device for the machine tool according to the second embodiment.

First, in Step S201, the current detection unit 11 detects the value of the current I driving the motor 2.

Moreover, in Step S202, the rotation speed detection unit 17 detects the rotation speed of the motor 2 and acquires the excitation frequency.

Then, in Step S203, the temperature-increase-value estimation unit 14 estimates, by using Formula 1, the temperature increase value Tc due to the copper loss of the motor 2 to be produced when the current I detected by the current detection unit 11 continuously passes through the motor 2. In addition, the temperature-increase-value estimation unit 14 estimates, by using Formula 6, the temperature increase value Ti due to the iron loss of the motor 2 to be produced when the motor 2 continuously rotates at the rotation speed detected by the rotation speed detection unit 17.

Moreover, in Step S204, the temperature detection unit 13 detects the temperature T of the motor 2. Note that the execution order of the operations in Steps S203 and S204 is interchangeable.

In Step S205, the temperature-increase-value estimation unit 14 calculates the difference between the temperature T detected by the temperature detection unit 13 and the ambient temperature, as the initial temperature-increase value T(0) at a certain time point.

Then, in Step S206, by using the overheat temperature (increased amount) Talm stored in the storage unit 12 in advance, the temperature increase value Tc due to the copper loss and the temperature increase value Ti due to the iron loss estimated by the temperature-increase-value estimation unit 14, and the initial temperature-increase value T(0) corresponding to the difference between the temperature T detected by the temperature detection unit 13 and the ambient temperature, the time estimation unit 15 calculates, using Formula 10, the time "Ts×n" from when the present estimation takes place until the motor 2 reaches the overheat temperature Talm, under the condition in which the motor 2 continuously rotates at the rotation speed detected by the rotation speed detection unit 17 and the current I continuously passes through the motor 2.

In Step S207, the provision unit 16 provides the time "Ts×n" from when the present estimation takes place until the motor 2 reaches the overheat temperature Talm, under the condition in which the current I continuously passes through the motor 2, the time "Ts×n" being calculated by the time estimation unit 15.

Next, a description will be given of a third embodiment. In the first embodiment described above, the time until the motor 2 reaches the overheat temperature Talm is estimated without taking into account iron loss, by using, as the initial temperature-increase value T(0), the difference between the temperature T near the motor 2 detected by the temperature detection unit 13 and the ambient temperature of the machine tool including the motor 2, by assuming the use of driving the motor 2 at a low speed. By contrast, in the third embodiment, the temperature increase value Tc due to copper loss is continually calculated by using, as a reference, the initial value of the ambient temperature at the turning-on of the machine tool, and then the temperature increase value T(n) of the motor 2 is continually calculated by substituting the calculated temperature increase value Tc into Formula 2. By using the temperature increase value T(n) thus calculated, as the initial temperature-increase value T(0), the time "Ts×n" from when the present estimation takes place until the motor 2 reaches the overheat temperature Talm under the condition in which the current I continuously passes through the motor 2, is calculated using Formula 5.

Figure 5:
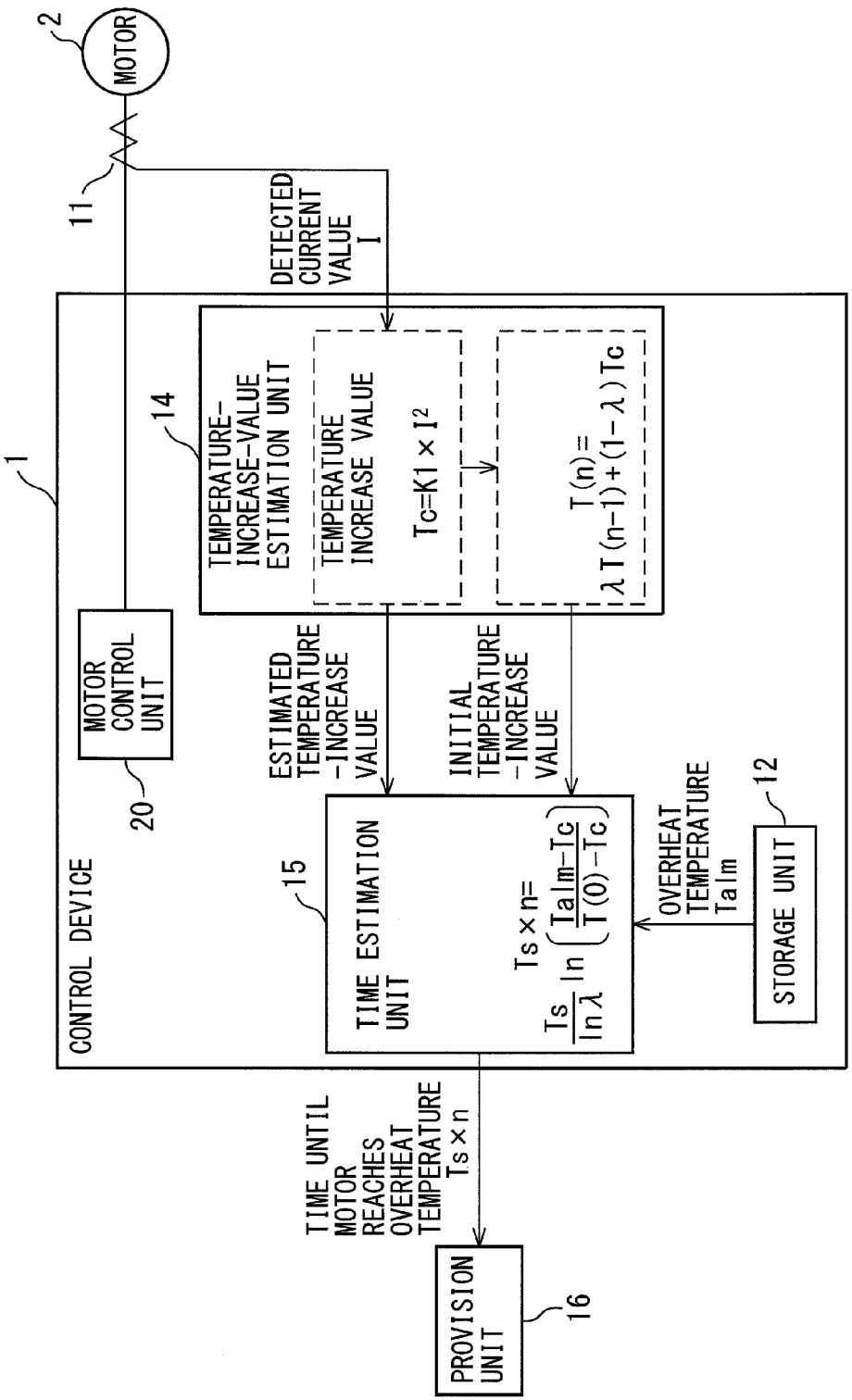
FIG. 5 is a block diagram showing a control device for a machine tool according to a third embodiment.

FIG. 5 is a block diagram showing a control device for the machine tool according to the third embodiment. According to the third embodiment, a control device 1 for the machine tool including a motor for driving a spindle includes the current detection unit 11, the storage unit 12, a temperature-increase-value estimation unit 14, a time estimation unit 15, and the provision unit 16. In addition, the control device 1 includes the motor control unit 20.

Since the current detection unit 11, the storage unit 12, the provision unit 16, and the motor control unit 20 are as described by referring to FIG. 1, detailed description of these units is omitted.

The temperature-increase-value estimation unit 14 continually calculates, using Formula 1, the temperature increase value Tc due to the copper loss of the motor 2 to be produced when the current I detected by the current detection unit 11 continuously passes through the motor 2, by using, as a reference, the initial value of the ambient temperature at the turning-on of the machine tool. Further, the temperature-increase-value estimation unit 14 substitutes the calculated temperature increase value Tc into Formula 2 to continually obtain the temperature increase value T(n) of the motor 2. The temperature increase value T(n) thus calculated is set as the initial temperature-increase value T(0).

Then, by using the overheat temperature (increased amount) Talm stored in the storage unit 12 in advance, the temperature increase value Tc due to the copper loss estimated by the temperature-increase-value estimation unit 14, and the initial temperature-increase value T(0) calculated by the temperature-increase-value estimation unit 14, the time estimation unit 15 calculates, using Formula 5, the time "Ts×n" from when the present estimation takes place until the motor 2 reaches the overheat temperature Talm, under the condition in which the current I continuously passes through the motor 2. In other words, in the third embodiment, the time estimation unit 15 calculates the time "Ts×n" from when the present estimation takes place until the motor 2 reaches the overheat temperature Talm, by using the temperature increase value Tc due to the copper loss and the overheat temperature Talm. The calculated time "Ts×n" is provided by the provision unit 16.

Figure 6:
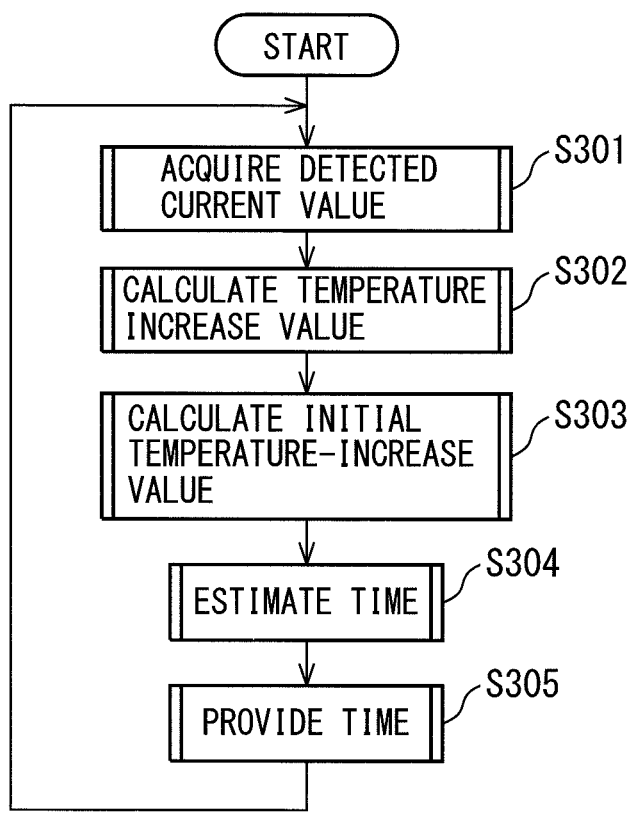
FIG. 6 is a flowchart showing an operation flow of the control device for the machine tool according to the third embodiment.

FIG. 6 is a flowchart showing an operation flow of the control device for the machine tool according to the third embodiment.

First, in Step S301, the current detection unit 11 detects the value of the current I driving the motor 2.

Then, in Step S302, the temperature-increase-value estimation unit 14 estimates, by using Formula 1, the temperature increase value Tc due to the copper loss of the motor 2 to be produced when the current I detected by the current detection unit 11 continuously passes through the motor 2.

Thereafter, in Step S303, the temperature-increase-value estimation unit 14 calculates the temperature increase value T(n) of the motor 2 by using the temperature increase value Tc due to the copper loss calculated in Step S302, and sets the temperature increase value T(n) thus calculated, as the initial temperature-increase value T(0).

Then, in Step S304, by using the overheat temperature (increased amount) Talm stored in the storage unit 12 in advance, the temperature increase value Tc due to the copper loss estimated by the temperature-increase-value estimation unit 14, and the initial temperature-increase value T(0) calculated by the temperature-increase-value estimation unit 14, the time estimation unit 15 calculates, using Formula 5, the time "Ts×n" from when the present estimation takes place until the motor 2 reaches the overheat temperature Talm, under the condition in which the detected current I continuously passes through the motor 2.

In Step S305, the provision unit 16 provides the time "Ts×n" from when the present estimation takes place until the motor 2 reaches the overheat temperature Talm, under the condition in which the current I continuously passes through the motor 2, the time "Ts×n" being calculated by the time estimation unit 15.

Next, description will be given of a fourth embodiment. In the third embodiment described above, the time until the motor 2 reaches the overheat temperature Talm is estimated without taking into account iron loss, by assuming the use of driving the motor 2 at a low speed. By contrast, in the fourth embodiment, the time until the motor 2 reaches the overheat temperature Talm is estimated by taking into account heat generation due to iron loss as well as copper loss, by assuming the use of driving the motor 2 at a high speed.

Figure 7:
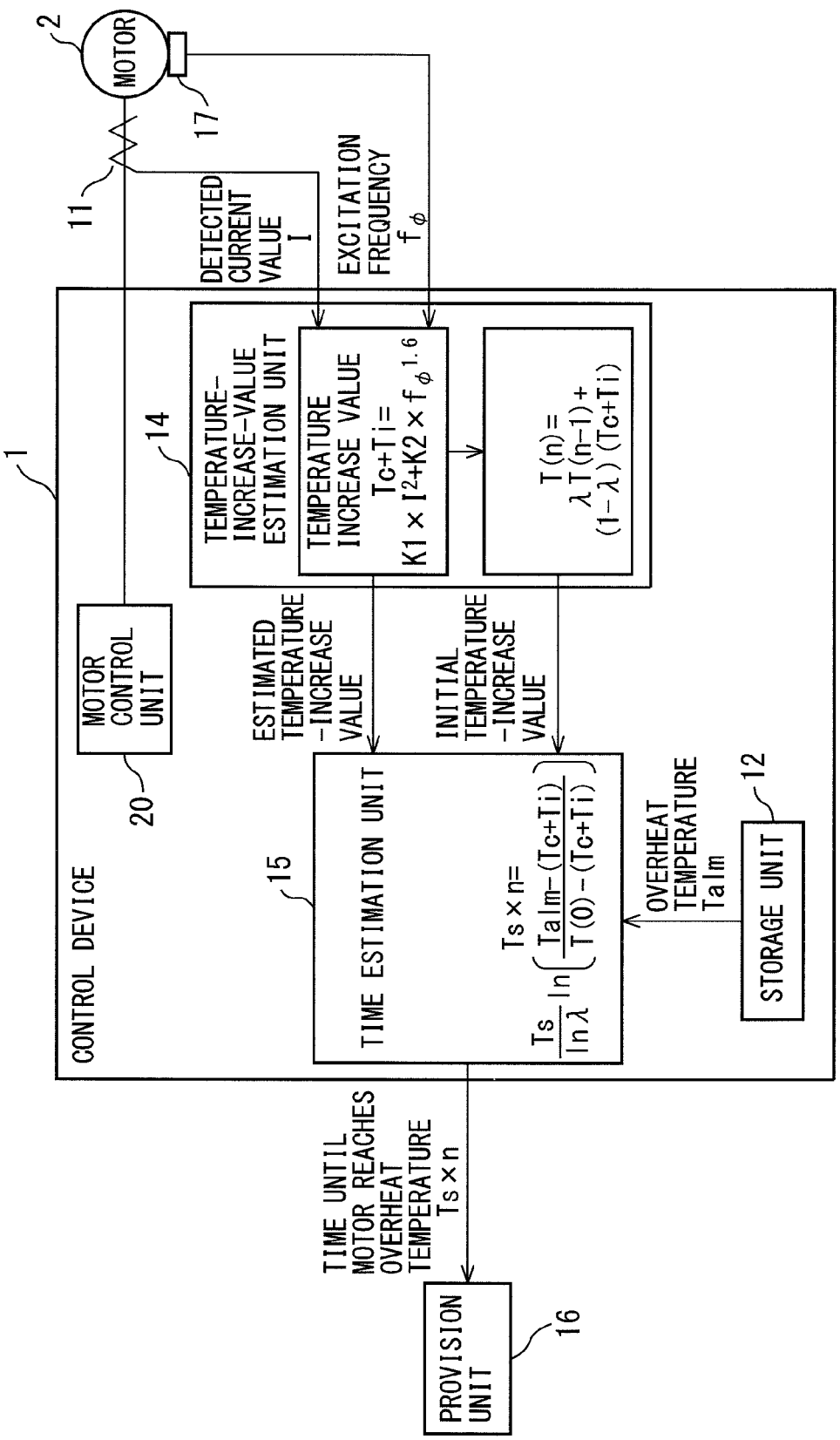
FIG. 7 is a block diagram showing a control device for a machine tool according to a fourth embodiment.

FIG. 7 is a block diagram showing a control device for a machine tool according to the fourth embodiment. According to the fourth embodiment, a control device 1 for the machine tool including a motor for driving a spindle includes the current detection unit 11, the storage unit 12, a temperature-increase-value estimation unit 14, a time estimation unit 15, the provision unit 16, and the rotation speed detection unit 17. In addition, the control device 1 includes the motor control unit 20.

Since the current detection unit 11, the storage unit 12, the provision unit 16, and the motor control unit 20 are as described by referring to FIG. 1, and the rotation speed detection unit 17 is as described by referring to FIG. 3, detailed description of these units is omitted.

As described above, when the motor 2 rotates at a low speed, an influence of copper loss is more dominant in the loss of the motor 2. By contrast, when the motor 2 rotates at a high speed, iron loss also has a large influence. In the fourth embodiment, assuming the use of driving the motor 2 at a high speed, the time until the motor 2 reaches the overheat temperature Talm is estimated by taking into account the copper loss and the iron loss. The iron loss is calculated as described in the second embodiment.

The temperature-increase-value estimation unit 14 continually calculates, using Formula 1, the temperature increase value Tc due to the copper loss of the motor 2 to be produced when the current I detected by the current detection unit 11 continuously passes through the motor 2, by using, as a reference, the initial value of the ambient temperature at the turning-on of the machine tool. Moreover, the temperature-increase-value estimation unit 14 continually calculates the temperature increase value Ti due to the iron loss of the motor 2 to be produced when the motor 2 continuously rotates at the rotation speed detected by the rotation speed detection unit 17, using Formula 6. Then, the temperature-increase-value estimation unit 14 substitutes the calculated temperature increase value Tc due to the copper loss and the calculated temperature increase value Ti due to the iron loss, into Formula 8 to continually obtain the temperature increase value T(n) of the motor 2. The temperature increase value T(n) thus calculated is set as the initial temperature-increase value T(0).

Then, by using the overheat temperature (increased amount) Talm stored in the storage unit 12 in advance, the temperature increase value Tc due to the copper loss and the temperature increase value Ti due to the iron loss estimated by the temperature-increase-value estimation unit 14, and the initial temperature-increase value T(0) calculated by the temperature-increase-value estimation unit 14, the time estimation unit 15 calculates, using Formula 10, the time "Ts×n" from when the present estimation takes place until the motor 2 reaches the overheat temperature Talm, under the condition in which the motor 2 continuously rotates at the rotation speed detected by the rotation speed detection unit 17 and the current I continuously passes through the motor 2. In other words, in the fourth embodiment, the time estimation unit 15 calculates the time "Ts×n" from when the present estimation takes place until the motor 2 reaches the overheat temperature Talm, by using the temperature increase value Tc due to the copper loss, the temperature increase value Ti due to the iron loss, and the overheat temperature Talm. The calculated time "Ts×n" is provided by the provision unit 16.

Figure 8:
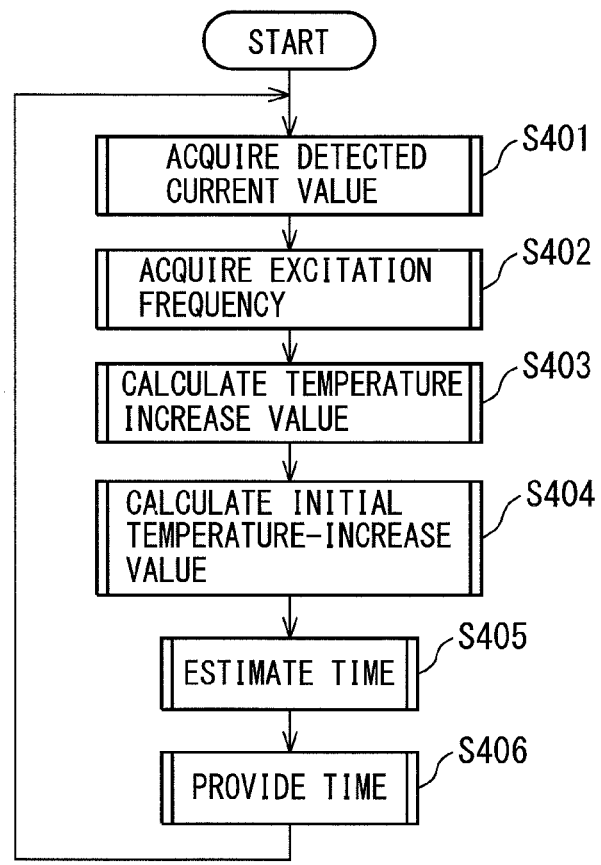
FIG. 8 is a flowchart showing an operation flow of the control device for the machine tool according to the fourth embodiment.
Figure 9:
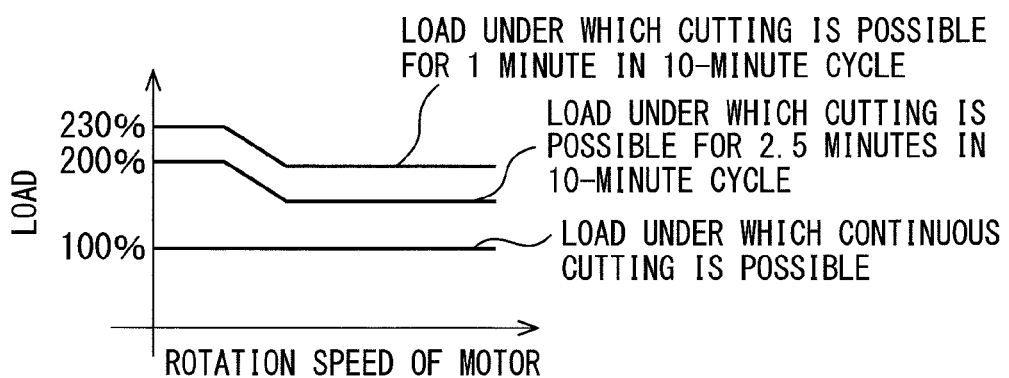
FIG. 9 is a graph showing an example of allowable load characteristics of a motor.

FIG. 8 is a flowchart showing an operation flow of the control device for the machine tool according to the fourth embodiment.

First, in Step S401, the current detection unit 11 detects the value of the current I driving the motor 2.

Moreover, in Step S402, the rotation speed detection unit 17 detects the rotation speed of the motor 2 and acquires the excitation frequency.

Then, in Step S403, the temperature-increase-value estimation unit 14 estimates, by using Formula 1, the temperature increase value Tc due to the copper loss of the motor 2 to be produced when the current I detected by the current detection unit 11 continuously passes through the motor 2. In addition, the temperature-increase-value estimation unit 14 estimates, by using Formula 6, the temperature increase value Ti due to the iron loss of the motor 2 to be produced when the motor 2 continuously rotates at the rotation speed detected by the rotation speed detection unit 17.

Thereafter, in Step S404, the temperature-increase-value estimation unit 14 calculates the temperature increase value T(n) of the motor 2 by using the temperature increase value Tc due to the copper loss and the temperature increase value Ti due to the iron loss calculated in Step S403, and sets the temperature increase value T(n) thus calculated, as the initial temperature-increase value T(0).

Then, in Step S405, by using the overheat temperature (increased amount) Talm stored in the storage unit 12 in advance, the temperature increase value Tc due to the copper loss and the temperature increase value Ti due to the iron loss estimated by the temperature-increase-value estimation unit 14, and the initial temperature-increase value T(0) calculated by the temperature-increase-value estimation unit 14, the time estimation unit 15 calculates, using Formula 10, the time "Ts×n" from when the present estimation takes place until the motor 2 reaches the overheat temperature Talm, under the condition in which the motor 2 continuously rotates at the rotation speed detected by the rotation speed detection unit 17 and the current I continuously passes through the motor 2.

In Step S406, the provision unit 16 provides the time "Ts×n" from when the present estimation takes place until the motor 2 reaches the overheat temperature Talm, under the condition in which the current I continuously passes through the motor 2, the time "Ts×n" being calculated by the time estimation unit 15.

The provision unit 16 in the above-described first to fourth embodiments may be implemented by an indicator provided to a numerical control device (not illustrated) for controlling the driving of the motor 2 included in the machine tool, or by an indicator externally connected to the numerical control device for the machine tool.

The present invention is applicable to a control device for a machine tool including a motor for driving a spindle.

According to the present invention, it is possible to provide a control device for a machine tool, the control device being capable of easily estimating the time until a motor reaches its overheat temperature under a condition in which the motor is driven under load. Since it is possible, in machining that involves application of load exceeding the continuous rated load, to know how long the machining can be continued under the current overload to the motor, the motor can be used optimally in terms of the performance of the motor without causing the motor to overheat.

What is claimed is:

1. A control device for a machine tool including a motor for driving a spindle, the control device comprising:
    a current detection unit that detects a current driving the motor;
    a storage unit that stores overheat temperature specified for the motor;
    a temperature detection unit that detects temperature of the motor;
    a time estimation unit that estimates, by using the temperature detected by the temperature detection unit and the overheat temperature, time from when present estimation takes place until the motor reaches the overheat temperature, under a condition in which the current detected by the current detection unit continuously passes through the motor; and
    a provision unit that provides the time estimated by the time estimation unit.

2. The control device for a machine tool according to claim 1, further comprising
    a temperature-increase-value estimation unit that estimates a temperature increase value due to copper loss of the motor produced when the current detected by the current detection unit continuously passes through the motor, wherein
    the time estimation unit estimates the time by using the temperature detected by the temperature detection unit, the overheat temperature, and the temperature increase value due to the copper loss.

3. The control device for a machine tool according to claim 2, further comprising
    a rotation speed detection unit that detects a rotation speed of the motor, wherein
    the temperature-increase-value estimation unit estimates the temperature increase value due to the copper loss, and a temperature increase value due to iron loss of the motor to be produced when the motor continuously rotates at the rotation speed detected by the rotation speed detection unit, and
    the time estimation unit estimates, by using the temperature detected by the temperature detection unit, the overheat temperature, the temperature increase value due to the copper loss, and the temperature increase value due to the iron loss, time from when present estimation takes place until the motor reaches the overheat temperature, under a condition in which the motor continuously rotates at the rotation speed detected by the rotation speed detection unit and in which the current detected by the current detection unit continuously passes through the motor.

4. The control device for a machine tool according to claim 1, wherein the provision unit is an indicator provided to a numerical control device for the machine tool.

5. The control device for a machine tool according to claim 1, wherein the provision unit is an indicator externally connected to a numerical control device for the machine tool.

6. A control device for a machine tool including a motor for driving a spindle, the control device comprising:
    a current detection unit that detects a current driving the motor;
    a temperature-increase-value estimation unit that estimates a temperature increase value due to copper loss of the motor to be produced when the current detected by the current detection unit continuously passes through the motor;
    a storage unit that stores overheat temperature specified for the motor;
    a time estimation unit that estimates, by using the temperature increase value due to the copper loss and the overheat temperature, time from when present estimation takes place until the motor reaches the overheat temperature, under a condition in which the current used for estimating the temperature increase value due to the copper loss continuously passes through the motor; and
    a provision unit that provides the time estimated by the time estimation unit.

7. The control device for a machine tool according to claim 6, further comprising
    a rotation speed detection unit that detects rotation speed of the motor, wherein
    the temperature-increase-value estimation unit estimates the temperature increase value due to the copper loss, and a temperature increase value due to iron loss of the motor to be produced when the motor continuously rotates at the rotation speed detected by the rotation speed detection unit, and
    the time estimation unit estimates, by using the temperature increase value due to the copper loss, the temperature increase value due to the iron loss, and the overheat temperature, time from when present estimation takes place until the motor reaches the overheat temperature, under a condition in which the motor continuously rotates at the rotation speed detected by the rotation speed detection unit and the current used for estimating the temperature increase value due to the copper loss continuously passes through the motor.

8. The control device for a machine tool according to claim 6, wherein the provision unit is an indicator provided to a numerical control device for the machine tool.

9. The control device for a machine tool according to claim 6, wherein the provision unit is an indicator externally connected to a numerical control device for the machine tool.

* * * * *